(12) United States Patent
Gass et al.

(10) Patent No.: US 7,835,515 B2
(45) Date of Patent: Nov. 16, 2010

(54) TELEPHONE TERMINAL WITH CONTROL OF VOICE REPRODUCTION QUALITY IN THE RECEIVER

(75) Inventors: Raymond Gass, Bolsenheim (FR); Michel Le Creff, Vigny (FR)

(73) Assignee: Alcatel, Paris (FR)

( * ) Notice: Subject to any disclaimer, the term of this patent is extended or adjusted under 35 U.S.C. 154(b) by 1462 days.

(21) Appl. No.: 10/968,259

(22) Filed: Oct. 20, 2004

(65) Prior Publication Data

US 2005/0084094 A1 Apr. 21, 2005

(30) Foreign Application Priority Data

Oct. 21, 2003 (FR) .................................. 03 12270

(51) Int. Cl.
  *H04M 1/00* (2006.01)
  *H04M 9/00* (2006.01)
(52) U.S. Cl. ................................................. 379/392.01
(58) Field of Classification Search ............ 379/392.01, 379/387.01
   See application file for complete search history.

(56) References Cited

U.S. PATENT DOCUMENTS

| | | | | |
|---|---|---|---|---|
| 5,475,712 A | * | 12/1995 | Sasaki | ......................... 375/241 |
| 6,259,691 B1 | * | 7/2001 | Naudus | ...................... 370/352 |
| 2002/0156623 A1 | | 10/2002 | Yoshida | |
| 2003/0091182 A1 | * | 5/2003 | Marchok et al. | ........ 379/392.01 |

FOREIGN PATENT DOCUMENTS

| | | |
|---|---|---|
| EP | 0 665 530 A1 | 8/1995 |
| WO | WO 00/31719 A | 6/2000 |
| WO | WO 02/101722 A | 12/2002 |

* cited by examiner

*Primary Examiner*—Alexander Jamal
(74) *Attorney, Agent, or Firm*—Sughrue Mion, PLLC

(57) ABSTRACT

A telephone terminal (UE) comprises telephone signal receiver means (MER) and processing means (MT) adapted in the absence of voice activity to determine a level of comfort noise to be generated as a function of noise data and in the presence of received telephone signals representing voice signals to determine noise signals as a function of noise data and then to subtract at least a portion of said noise signals from the received telephone signals.

11 Claims, 2 Drawing Sheets

TELEPHONE TERMINAL WITH CONTROL OF VOICE REPRODUCTION QUALITY IN THE RECEIVER

FIELD OF THE INVENTION

The field of the invention is that of communications terminals, more particularly that of terminals providing a telephone function enabling them to exchange voice signals.

BACKGROUND OF THE INVENTION

As is well known in the art, the quality of a telephone call is frequently degraded by the terminals themselves and by the communications network equipment.

The deterioration generally results from one or more parameters such as echo, transmission time (or delay), distortion, signal loss, and signal compression. It is more particularly sensitive in the case of Voice Over IP (VoIP) telephone calls via the Internet, where telephone signals are sent in the form of packets after analog-to-digital conversion, coding, and compression.

Various solutions have been proposed in an attempt to limit the effects of one or more of the above parameters. Thus, echo may be controlled using echo controllers or suppressors conforming to the ITU-T G.131 standard. Transmission times and packet loss rates may be reduced by monitoring voice data traffic at the network level. Telephone terminals may also be adapted to allow users to vary the volume of the received sound, in particular if they have a hearing problem or the received sound level is very low.

Those solutions undoubtedly reduce the deterioration induced by the parameter concerned, but in some circumstances they may exacerbate the deterioration induced by some other parameter. Thus adjusting the receive sound level has negative effects on stability loops and on echo in particular.

Improving the signal-to-noise ratio by operating on the telephone signals before they are sent has also been proposed. Thus the methods described in documents EP 1 104 925 A1 and US 2002/0156623 A1 propose subtracting a noise function, or noise, from the voice signals to be sent just before they are coded. The method described in document WO 02/101722 proposes to substitute comfort noise for noise superimposed on the voice.

Operating on the original (or native) signals, the above three methods modify their nature, to the extent that the receiving user is unable to discern the sound environment of the sending user. What is more, those methods increase the number of processing operations that the sending telephone terminal has to perform, which consumes CPU resources that could be used for other tasks.

What is more, the prior art solutions take no account of recently developed methods of VOIP signal processing and in particular voice activity detection (VAD) mechanisms.

An object of the invention is to improve on the above situation, in particular in noisy environments, no prior art solution being entirely satisfactory.

BRIEF SUMMARY OF THE INVENTION

To this end the invention proposes a telephone terminal comprising telephone signal receiving means and processing means adapted in the absence of voice activity to determine a level of comfort noise to be generated as a function of noise data and in the presence of received telephone signals representing voice signals to determine noise signals as a function of noise data and then to subtract at least a portion of said noise signals from the received telephone signals.

The processing means are preferably adapted to subtract from telephone signals received during a voice activity phase (i.e. representing voice signals) noise signals deduced from noise data associated with a phase of absence of voice activity that preceded said voice activity phase.

The noise data represents spectral and energy characteristics of the noise at the sending terminal, for example.

At least some of the noise data may be sent by the sending terminal in the form of silence information descriptor (SID) frames constituting telephone signals.

Instead of this, or in addition to this, the telephone terminal may include analysis means for determining noise data from received telephone signals in order to deliver them to the processing means. In this case, the analysis means may be configured to determine the noise data during phases in which there is no voice activity. The analysis means may be adapted to deliver the noise data to the processing means in the form of silence information descriptors (SID). In this case, it is advantageous if the analysis means constitute a voice activity detector (VAD) module.

Of course, if the noise data is integrated into silence information descriptors (SID), the processing means extract the data therefrom.

It is advantageous to provide observation means supplied with received telephone signals by the send/receive means and adapted to determine whether the received telephone signals comprise silence information descriptors and/or information data accompanying voice and noise signals and to send the received telephone signals either to the processing means if they comprise information data and/or silence information descriptors or to the analysis means if they comprise no information data or silence information descriptors.

According to another feature of the invention, the processing means may be adapted to determine the level of comfort noise to be generated and the portion of the noise signals to be subtracted from the received telephone signals as a function of instructions given by the user of the telephone terminal containing them.

The invention is particularly suitable, although not exclusively so, for communications terminals having a VoIP telephone application.

Other features and advantages of the invention will emerge on reading the following detailed description and examining the appended drawings, in which:

The appended drawings not only constitute part of the description of the invention but may also contribute to the definition of the invention, if necessary.

DETAILED DESCRIPTION OF THE EMBODIMENTS

An object of the invention is to manage the quality of sound reproduction by a communications terminal providing a telephone function.

In the present context, the expression "communications terminal" refers to any fixed or mobile communications equipment adapted to exchange telephone signals in one or more communications networks, such as cellular and non-cellular public and/or private telephone networks and public and/or private data networks, for example, and possibly via a local area network (LAN) or a wireless local area network (WLAN). It refers, for example, to a fixed or portable (or mobile) computer, a fixed or mobile telephone, or a personal digital assistant (PDA).

Additionally, in the present context, the expression "telephone network" refers to a network belonging to a telephone operator, for example a public switched telephone network (PSTN) or a public land mobile network (PLMN), for example a GSM, GSM/GPRS or UMTS network, and the expression "data network" refers to a network using the Internet Protocol (IP), for example.

Figure 1:
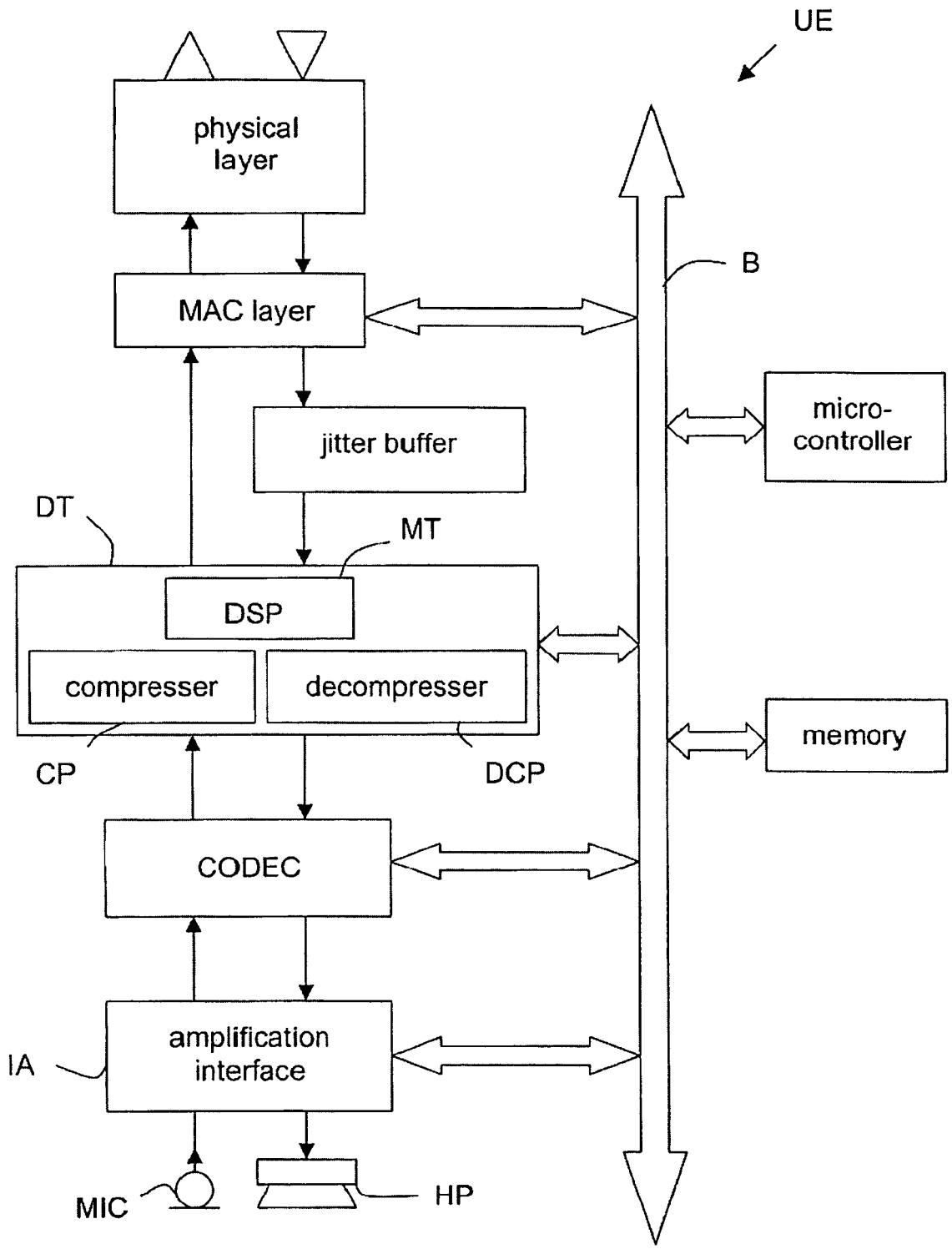
FIG. 1 shows diagrammatically the relations between the main functional modules of an Ethernet or WLAN telephone terminal.

It is considered hereinafter that the communications terminal is a mobile telephone UE adapted to provide a Voice Over IP (VoIP) service, as shown in FIG. 1. Of course, the invention is not limited to this type of communications terminal and relates in particular to microcomputers equipped with a loudspeaker, a microphone and a telephone software application (or a portion of a telephone software application), better known as a "soft phone".

The telephone UE shown diagrammatically in FIG. 1 is of the WLAN type, for example. It therefore comprises a physical layer WLAN coupled on the receive channel and on the send channel to a medium access control (MAC) layer. If the telephone were of the LAN type, it would have an Ethernet physical layer instead of the WLAN physical layer.

On the send side, the MAC layer is coupled to a processor DT comprising a digital signal processing (DSP) module MT, a data compression module (labeled "compressor" in the figure) CP, and a data decompression module ("decompressor") DCP. The coupling between the MAC layer and the processor DT on the send channel is direct, whereas on the receive channel (to which the invention relates) it is effected via a jitter processing buffer module ("jitter buffer").

The WLAN physical layer, the MAC layer, and the jitter buffer constitute parts what is referred to hereinafter as the send/receive module MER (see FIG. 2).

The processor DT, which is a microprocessor, for example, is coupled on the receive channel and on the send channel to a coder/decoder (CODEC) which is in turn coupled on the receive channel and on the send channel to an amplification interface module IA. The amplification interface module IA is coupled on the receive channel and on the send channel to a microphone MIC and a loudspeaker HP.

The telephone UE further comprises a data bus B, for example of the PCMCIA type, coupled in particular to the MAC layer, the processor DT, the CODEC, the amplification interface module IA, a microcontroller, and at least one memory.

The respective operation and functions of the layers and modules cited above being well known to the person skilled in the art, they are not described here.

One example of an arrangement for implementing the invention on the receive channel of a telephone UE is described next with reference to FIG. 2.

The invention relates more particularly to the processor DT of the telephone UE, which is coupled to the CODEC and to the send/receive module MER, which is in turn coupled to a send/receive antenna AER. The antenna AER is for sending and receiving telephone signals when a connection has been set up between the telephone UE and a remote terminal in order to enable their respective users to converse.

It is important to note at this point that a telephone conversation may be broken down into phases of "voice activity" and phases of "silence" (i.e. of the absence of voice activity). In an IP network, voice activity is sent in the form of a substantially continuous stream of sequences of data packets representing voice and background noise.

The data packets sent may contain information data indicating that they contain voice and noise signals. In this case, the telephone that sends the packets must have a voice activity detection (VAD) module adapted, during phases of voice activity, to add to the voice and noise signals information data (indicating VAD processing and in the form of a header, for example), and, during phases of silence, to generate noise data representing background noise, and generally also comprising information data (indicating VAD processing and in the form of a header, for example).

To be more precise, the VAD module generates frames that contain silence insertion descriptors (SID) containing noise data.

SID frames are defined in Appendix A of the ITU-T G.723.1 standard and voice activity detection (VAD) is defined in Appendix B of the ITU-T G.729 standard. Additional information relating to voice activity detection (VAD) may also be found in the patent document FR 2825826.

The noise data comprises information describing frequency and energy spectra representing background noise during a phase of silence, for example.

The SID frames are sent discontinuously. They are generally interleaved between voice and noise data packet streams.

It is important to note that the invention also relates to situations in which the sending telephone terminal has no voice activity detection module. In this case, the voice and noise data packets contain no information data and no data specifically dedicated to background noise sent by the sending telephone terminal to the receiving telephone terminal. Consequently, in the present context the expression "telephone signals" refers equally to signals made up of packets of voice and noise data, with or without information data, and signals consisting of SID frames containing noise data, with or without information data. Remember that if the sending telephone is not equipped with a VAD module, it generally sends telephone signals throughout the conversation, including during phases of silence.

According to the invention, the processor DT comprises at least one digital signal processing (DSP) module MT for controlling the quality of sound reproduction. This processing module MT is more particularly responsible, during phases of silence, i.e. in the absence of voice activity, for determining a comfort noise level to be generated as a function of noise data and, in the presence of received telephone signals, to determine noise signals as a function of noise data and then to subtract at least a portion of the noise signals determined in this way from the received telephone signals.

Figure 2:
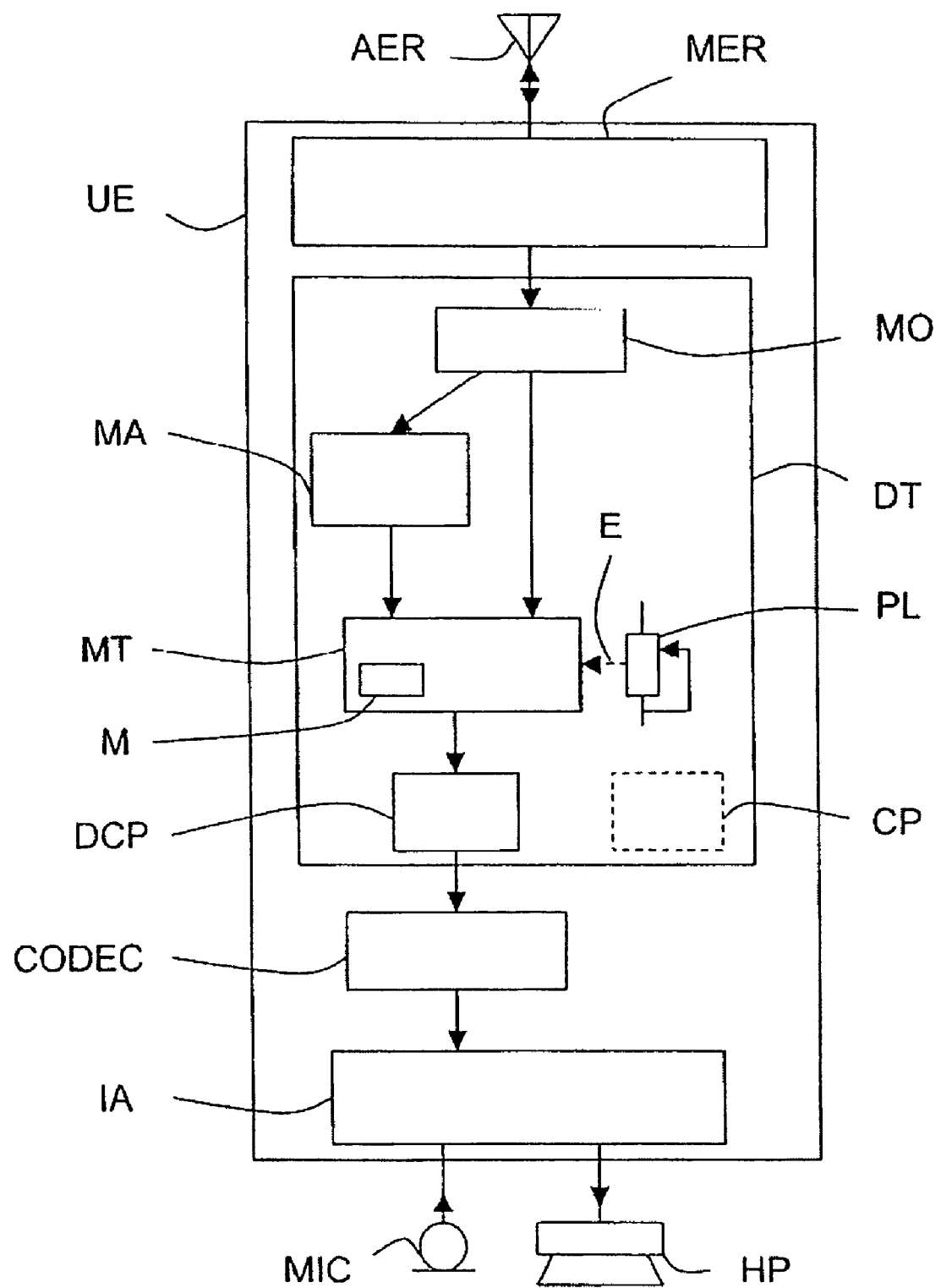
FIG. 2 shows diagrammatically one example of the arrangement of the functional modules on the receive channel of a telephone terminal for implementing the invention.

In the embodiment shown in FIG. 2, the processor DT is also adapted to process received telephone signals that comprise neither information data nor noise data, referred to as type I signals, and received telephone signals that contain information data and/or noise data, referred to as type II signals.

Of course, a first variant may be envisaged in which the processor DT is adapted only to process received telephone signals that comprise neither information data nor noise data and a second variant may be envisaged in which the processor DT is adapted to process only received telephone signals that contain information data and/or noise data.

To provide for this two-fold processing, the FIG. 2 processor DT comprises an observer module MO and an analyzer module MA in addition to the processor module MT, the compressor CP and the decompressor DCP.

The observer module MO is supplied with telephone received signals by the send/receive module MER. It is adapted, each time that the send/receive module MER sends it received telephone signals, to determine whether the telephone signals contain noise data or information data accompanying voice and noise signals. In other words, the observer module MO determines if the received telephone signals are of type I or of type II.

The observer module MO is additionally adapted to send the received telephone signals either to the processor module MT if they contain information data and/or noise data or to the analyzer module MA if they contain neither information data nor noise data.

The analyzer module MA is adapted to analyze the received telephone signals (of type I) in order to deduce noise data from them. The analyzer module MA may be a voice activity detector (VAD) module delivering noise data in the form of silence information descriptors (SID), for example.

Having the analyzer module MA perform the above determinations only during phases in which voice activity is absent may be envisaged. It is in fact easier to determine the characteristics of background noise when it is not superimposed on (or mixed with) voice.

It is considered hereinafter that the analyzer module MA is a VAD module adapted to deliver SID frames and that the noise data that is sent to the receiving telephone UE takes the form of SID frames. In this case, the processor module MT is configured to extract from the SID frames the noise data that they contain, whether that data comes directly from the observer module MO or from the analyzer module MA. Accordingly, the processor module MT processes only signals of type II, since it is always supplied with signals of type II coming either directly from the observer module MO or from the analyzer module MA (after conversion from type I to type II).

It is important to note that in this configuration no information is given concerning the use of a VAD module during the phase of setting up the call between the two telephones. Consequently, the receiving telephone UE deduces, by default, that it must use its own VAD module to provide SID frames.

If the processor module MT receives from the observer module MO or the analyzer module MA silence information descriptors (SID) corresponding to a phase of silence, it extracts noise data therefrom and then determines from that data a comfort noise level to be generated to reproduce some or all of the background noise at the sender end during said phase of silence.

This noise level may be determined as a function of an instruction given by the user of the receiving telephone UE and received at an input E of the processor module MT coupled to the man/machine interface of said telephone. For example, this instruction may represent a sound intensity level. The level of noise generated is defined by the operation $Noise_{SID}-Noise_{SID}/n$, for example, where $Noise_{SID}$ represents the background noise as defined by the noise data extracted from the SID frames received and n is a value greater than or equal to 1. The value of n may be set by a "software potentiometer" PL controlled by the processor module MT, taking account of instructions given by the user.

The processor module MT includes a memory M in which it stores noise data extracted from the SID frames that it has received, and preferably the value of the associated parameter n, in order to be able to use them again when it receives voice and (real) noise data.

The comfort noise generated by the processor module MT is sent to the decompressor DCP. At this stage, the comfort noise is still in the form of compressed and coded digital signals.

For example, the signals are compressed to a bit rate of 8 kbit/s and decompressed by the decompressor DCP to a bit rate of 64 kbit/s, which corresponds to the time division multiplexing (TDM) standard.

The decompressed but still coded signals are then fed to the CODEC.

Remember that the type of coding chosen for a telephone conversation is set by the two telephones concerned during the exchange of signaling that takes place during the call set-up phase. The coding may therefore be linear or use G.711 codes (A or μ law), and then compressed using other codes, for example G.723 or G.729 codes.

The signals decoded by the CODEC are fed to the amplification interface module IA that is coupled to the loudspeaker HP (and to the microphone MIC). They are then amplified and converted into sound signals audible by the user of the receiving telephone UE.

If the processor module MT receives from the observer module MO or the analyzer module MA packets of voice and noise data accompanied by information data indicating a phase of voice activity, it extracts therefrom the superimposed (or mixed) voice and real noise data and then accesses its memory M in order to extract the most recent noise data ($Noise_{SID}$) and where applicable the value of the associated parameter n which corresponds to the phase of silence that preceded said phase of voice activity.

The processor module MT then subtracts noise constructed from the noise data ($Noise_{SID}$), and where applicable from the value of the associated parameter n extracted from the memory M, from the voice and real noise data. As indicated above, the level of noise that is subtracted may be determined as a function of an instruction received from the user of the receiving telephone UE at the input E of the processor module MT. However, it is preferable if it corresponds to the value of the parameter n that was used to generate the comfort noise. Consequently, it is preferable for the processor module MT to carry out the operation:

$$(Voice+Noise_{Real})-(Noise_{SID}/n)$$

Lumping together the noise ($Noise_{SID}$) that corresponds to a phase of silence preceding a phase of voice activity and the noise ($Noise_{Real}$) superimposed on (or mixed with) the voice during said phase of voice activity is an excellent approximation. In fact, during a conversation, there are many phases of silence interleaved between phases of voice activity, and the mean time interval between two audible background noise variations is generally much longer than the mean time interval between two phases of silence.

The subtraction operation is particularly easy if the telephone signals are coded linearly or using G.711 codes (A or μ law). It is slightly more complex if the packets are additionally compressed using other codes, for example G.723 or G.729 codes.

The subtraction result supplies digital data that still represents the sending user's voice and background noise but in which the signal (voice) to noise ratio is increased selectively (as a function of the value of the parameter n). As indicated above, this digital data is sent to the decompressor DCP for decompression, is then sent to the CODEC for decoding, and, when decompressed and decoded, is then sent to the amplification interface module IA and finally to the loudspeaker HP that converts it into sound.

Thanks to the invention, the signal-to-noise ratio may be increased by a chosen amount by operating only on the received telephone signal and using little of the CPU resources of the receiving telephone UE.

The processor module MT, the analyzer module MA and the observer module MO of the invention may take the form of electronic circuits, software (or data processing) modules, or a combination of circuits and software.

The invention is not limited to the communications terminal embodiments described hereinabove by way of example only, but encompasses all variants that the person skilled in the art might envisage that fall within the scope of the following claims.

Thus a communications terminal, for example of the IP telephone type, may be envisaged in which the processor DT is integrated into a component such as the microcontroller, for example, or the CODEC and/or the jitter buffer and/or the MAC layer.

What is claimed is:

1. A telephone terminal having telephone signal receiving means comprising:
   processing means adapted, in the absence of voice activity in a received telephone signal, to determine a level of comfort noise to be generated as a function of noise data relating to said received telephone signal and, in the presence of received telephone signals representing voice signals, to determine noise signals as a function of noise data and then to subtract at least a portion of said noise signals from the received telephone signals; and
   a sound generator that generates said determined level of comfort noise during said absence of voice activity in said received telephone signal
   wherein said noise data represents spectral and energy characteristics of noise.

2. A telephone terminal according to claim 1, wherein said processing means is adapted to subtract from telephone signals received during a voice activity phase noise signals deduced from noise data associated with a phase of absence of voice activity that preceded said voice activity phase.

3. A telephone terminal according to claim 1, wherein at least some of said noise data is sent by a sending terminal in the form of silence information descriptors constituting telephone signals.

4. A telephone terminal according to claim 1, further comprising an analysis means adapted to determine noise data from received telephone signals and to deliver said noise data to said processing means.

5. A telephone terminal according to claim 4, wherein said analysis means are adapted to determine said noise data during phases of absence of voice activity.

6. A telephone terminal according to claim 4, wherein said analysis means are adapted to deliver said noise data to said processing means in the form of silence information descriptors.

7. A telephone terminal according to claim 6, wherein said analysis means take the form of a voice activity detector module.

8. A telephone terminal according to claim 3, wherein said processing means are adapted to extract said noise data from the silence information descriptors.

9. A telephone terminal according to claim 8, further comprising observation means supplied with received telephone signals by said send/receive means and adapted to determine whether said received telephone signals comprise silence information descriptors or information data accompanying voice and noise signals, and to send said received telephone signals either to said processing means when they contain information data or silence information descriptors, or to said analysis means when they contain no information data and no silence information descriptors.

10. A telephone terminal according to claim 1, wherein said processing means is additionally adapted to determine the level of comfort noise to be generated and the portion of the noise signals to be subtracted from the received telephone signals as a function of instructions given by the user of the receiving terminal.

11. A telephone terminal according to claim 1, wherein said telephone terminal is an internet protocol telephone.

* * * * *